Nov. 10, 1959    B. F. McNAMEE    2,912,638
COMPENSATING CIRCUIT FOR TRANSISTOR REGULATORS
Filed Aug. 26, 1958
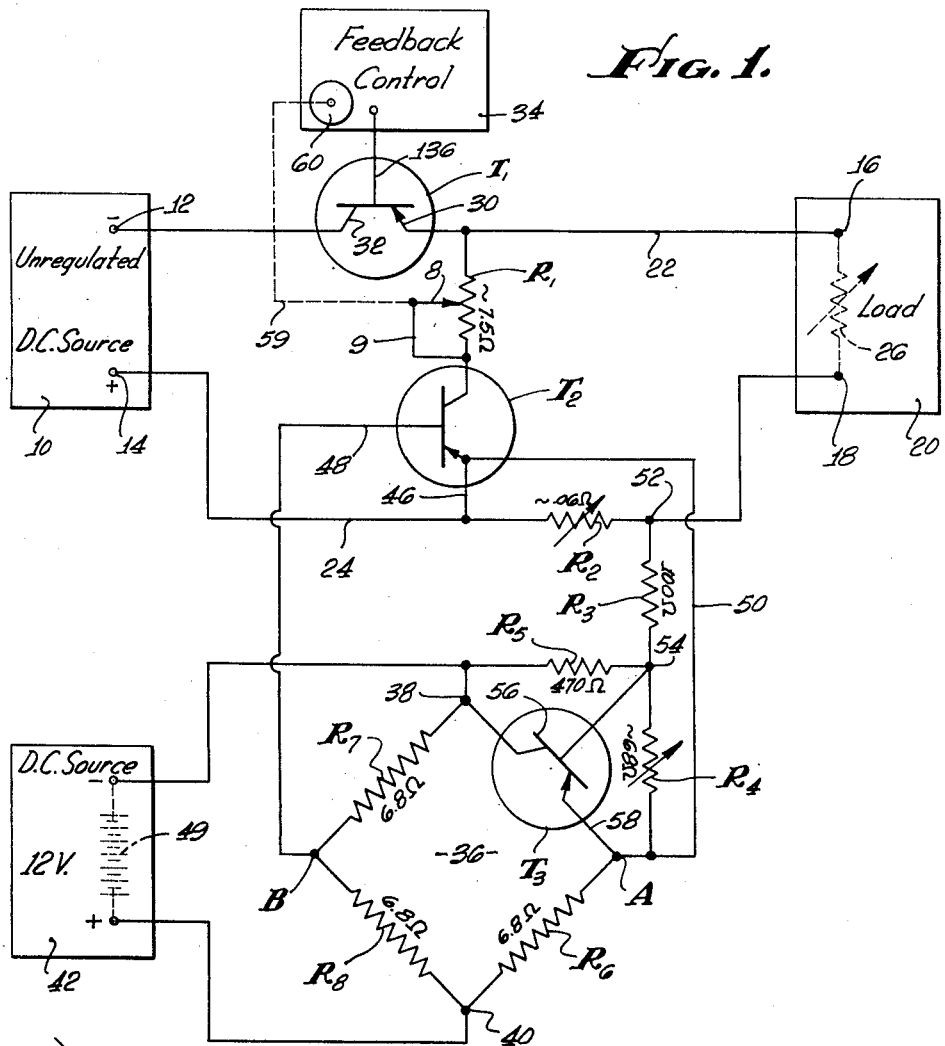
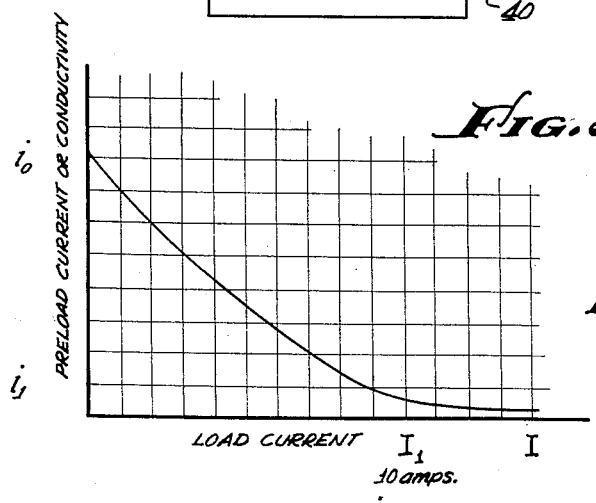
BERNARD F. McNAMEE,
INVENTOR.
BY Flam and Flam
ATTORNEYS.

United States Patent Office 2,912,638
Patented Nov. 10, 1959

2,912,638

COMPENSATING CIRCUIT FOR TRANSISTOR REGULATORS

Bernard F. McNamee, Altadena, Calif., assignor to Dressen-Barnes Corporation, Pasadena, Calif., a corporation of California Application August 26, 1958, Serial No. 757,328

8 Claims. (Cl. 323—22)

This invention relates to electrical systems utilizing transistors, and particularly to transistorized series regulation circuits or the like.

A particular problem in connection with transistorized circuits of this character is that a substantial collector current flows even in the absence of a base control current. If the load is reduced substantially, the flow of transistor collector current nevertheless is compulsive. The output voltage tends to rise to the limit of the supply voltage, sending damaging currents through the load. If the load is entirely removed, the output voltage rises to the limit of the supply voltage so that smooth transition upon connection of the load is impossible.

The collector current at zero base current bears a substantial relationship to the current rating of the transistor itself. Unfortunately the zero base control collector current substantially doubles, more or less, for every 10° C. temperature rise.

It has been proposed in the past to provide a bleeder or preload at the output of the regulator circuit in order to accommodate this minimum collector current. There are serious disadvantages to this arrangement although the basic problems discussed above are overcome. Thus, the power consumption in the preload circuit may be considerable, especially if the temperature of the transistor is high. Since the preload circuit continuously absorbs power despite the condition of the load, the cooling load is increased. Furthermore the entire current rating of the regulator must be increased to obtain the same useful output current.

The primary object of this invention is to overcome these disadvantages and accommodate the collector current without requiring any added rating of the regulator and without requiring extra facilities for cooling.

This is made possible by a novel controlled preload circuit that passes current in relation to the extent that the main load circuit is inadequate. Thus, means responsive to the load current alters the operation of the preload circuit in such manner that for zero load the preload circuit passes the entire collector current. When the load becomes increasingly operative, the preload circuit becomes decreasingly conductive.

Another object of this invention is to provide a transistor regulator system of this character in which the conductivity of the preload circuit changes without noticeable, if any, discontinuities throughout the operating range. No strain is imposed upon the regulation system.

Still another object of this invention is to provide a simple and novel control network for accomplishing these purposes, and that incorporates simple provisions for calibration whereby optimum yet safe performance is achieved.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a diagrammatic view of a voltage regulation system incorporating the present invention; and Fig. 2 is a graph illustrating bleeder or preload circuit current as a function of useful load current.

In Fig. 1, there is illustrated an unregulated direct current source 10 having terminals 12 and 14 respectively connected to terminals 16 and 18 of a load 20. Leads 22 and 24 indicate the connection.

The load 20 is variable, and the need for voltage regulation arises. A variable resistor 26, shown in phantom lines, denotes the variable characteristics of the load. A transistor $T_1$, having its emitter 30 and collector 32 serially inserted in one of the leads 22, maintains the voltage across the load terminals 16 and 18 at a substantially constant value despite load fluctuations. This is done in a well-known manner by the aid of a feed-back control network 34, for example, which controls the current flowing through the base 136 of the transistor $T_1$ which in turn varies the conductivity of the transistor, whereby the load voltage is adjusted.

When the load 20 is very small, the feedback control 34 can do no more than eliminate the current to the base 36. Under these circumstances, especially when the transistor $T_1$ is operating at a moderately high temperature, substantial currents will nevertheless tend to flow between the emitter 30 and collector 32. To accommodate this current, a bleeder or preload circuit is provided with which parallels the load terminals 16 and 18. The preload branch may be traced from the transistor electrode 30 to the opposite side of the circuit in parallel relationship to the load 20 as follows: one side of a resistor $R_1$, a tap 8 which adjustably cooperates with the resistor $R_1$, through a shunt 9 to the other side of the resistor $R_1$, a collector and an emitter of a transistor $T_2$ to the line 24.

When the load 20 is relatively light or virtually nil, the conductivity of the bleeder or preload circuit must be substantial in order to accommodate the minimum current of the regulating transistor $T_1$. When the load 20 is heavy, on the contrary, the conductivity of the bleeder or preload circuit can be very small or virtually nil inasmuch as the load 20 itself is capable of consuming the minimum current of the transistor $T_1$.

A very small resistor $R_2$, serially inserted in the lead 24 to the load 20, provides a voltage drop that is a measure of the load current. This voltage controls the conductivity of the transistor $T_2$ so that the bleeder circuit conductivity as a whole is varied in order to fulfill the foregoing requirements.

A bridge network 36 assimilates the information derived from the sensing resistor $R_2$. The bridge 36 includes two branches extending between input terminals 38 and 40. A small direct current voltage is applied across these terminals to provide the requisite bridge excitation. For this purpose, a D.C. source 42 is illustrated that, by way of example, may consist of a small battery 44.

One of the bridge branches comprises two serially connected resistors $R_7$ and $R_8$. The other branch comprises a variable conductivity device, in this instance, a third transistor $T_3$, and a resistor $R_6$.

The output of the bridge appears between bridge terminals B and A, the point or terminal B being located between the resistors $R_7$ and $R_8$, and the terminal A being located between the variable conductivity device $T_3$ and the resistor $R_6$. The bridge output is applied directly across the emitter 46 and base 48 of the bleeder transistor $T_2$, the bridge itself forming a load in the transistor input circuit.

If the bridge 36 is balanced or nearly balanced, minimum base currents for the transistor $T_2$ can be made to flow, and the conductivity of the transistor $T_2$ and the bleeder circuit will be minimum. This condition is desired under conditions of high load. If the bridge 36 is unbalanced, the bridge output can be made to increase the conductivity of the transistor $T_2$ and that of the bleeder circuit. This condition is desired when the load 20 is at a very minimum.

The resistors $R_6$, $R_7$ and $R_8$ have values very nearly equal to each other and to the operating resistance of the transistor $T_3$ in order to obtain appropriate bridge output. A control circuit couples the transistor $T_3$ and the sensing resistor $R_2$.

Resistors $R_4$ and $R_5$ serially parallel the bridge branch formed by the transistor $T_3$ and determine the normal conductivity of the transistor so that the bridge is unbalanced. These resistors have a very high value, at least as compared to the resistance of the bridge elements per se so that their effect upon the bridge circuit is negligible. These resistors $R_4$ and $R_5$ form a voltage dividing network from the source 42, the resistors for all practical purposes being placed directly across the D.C. source 42, the resistance of $R_6$ being small. The resistor $R_4$ of the voltage divider $R_4$—$R_5$ is actually paralleled by resistor $R_3$. The circuit may be traced as follows: output terminal A, lead 50, lead 24, sensing resistor $R_2$ (the value of which may be neglected), a control terminal 52, resistor $R_3$, to the mid-terminal 54 between the resistors $R_4$ and $R_5$. The control terminal 54 connects directly to the base 56 of the transistor $T_3$. Depending upon the values of resistors $R_3$, $R_4$ and $R_5$, a normal base current is passed through the transistor $T_3$.

The control terminal 54 normally (i.e., for no load) is at a voltage not far different from that of the bridge input terminal 40. The reason for this is that the resistor $R_4$ and the resistor $R_3$ in parallel thereto have an effective resistance substantially less than that of the resistance of $R_5$. Under these circumstances, the bridge 36 is unbalanced, and the bridge output produces high preload circuit conductivity. This high conductivity may be adjusted according to the requirements of the transistor $T_1$ by changing the normal voltage of the control terminal 54. This is done in this instance by the resistor $R_4$ which is adjustable for this purpose.

If load current flows in the lead 24, the input circuit of the transistor $T_3$ is altered, the extent of bridge unbalance is reduced, output and thus preload circuit conductivity is decreased. The current through the main load 20 actually divides between the small resistor $R_2$ and the bridge circuits which parallel it. Most of the main load current goes through the small resistor $R_2$, but a certain small proportion thereof goes through the resistor $R_3$ and all of the elements that are connected between the terminals 54 and A including the base 56 of the bridge transistor $T_3$. The conductivity of the transistor $T_3$ accordingly varies as a function of load current, and the bridge output is correspondingly reduced.

In Fig. 2, there is illustrated a curve in which preload current or conductivity is plotted against useful load current, that is, the current in the load 20. The preload current starts at a maximum $i_0$ for no load current. By adjusting the resistor $R_4$, the value of $i_0$ may be changed to ensure that the minimum current of the regulating transistor $T_1$ can be accommodated for all adverse operating conditions. The preload current diminishes continuously to a minimum value $i_1$. Desirably the minimum preload current reaches this minimum as soon as possible so that the combined current in the entire system is kept small. But the limiting factor is that an increased current through the load 20 must at least compensate or counterbalance any decrease in the preload current. Otherwise, there will be no accommodation of the minimum transistor current.

For given initial conditions of the bridge (which determine the value of the initial preload current $i_0$), the preload current reaches its minimum $i_1$ relative to load current, in accordance with the relative distribution of current between the bridge circuits and the sensing resistor $R_2$. In other words, if the proportion of current flowing through the bridge circuits and therefore through the base lead 56 of the transistor $T_3$ is relatively increased, the bridge balance point will be reached at a lower load current.

Adjustment is achieved by varying the ratio of the combined resistance of the bridge current to the sensing resistor $R_2$. In order to avoid disturbing the initial bridge conditions, this adjustment is accomplished by varying the value of the sensing resistor $R_2$. Thus, since this resistance is extremely small, it does not perceptibly affect the bridge circuit per se.

Typical values for the resistors are indicated in Fig. 1. The individual values are not critical.

When the operating voltage of the system is substantial, it may be necessary to ensure against excess power dissipation in the preload transistor $T_2$. The resistor $R_1$, which forms a serial part of the bleeder or preload circuit, serves to absorb part of the power. The maximum power dissipated in the transistor $T_2$ may be kept virtually constant and low for all values of operating voltages by adjusting the effect of the resistor $R_1$ in accordance with the operating voltage of the system. This may be done by a mechanical coupling, indicated diagrammatically at 59, between the shunt tap of the resistor $R_1$ and an adjustable voltage control 60 forming a part of the feedback network 34.

The transistors $T_1$, $T_2$ and $T_3$ are of a type PNP or NPN suitable for the system as a whole. Appropriate polarities can readily be determined in accordance with standard practices in the transistor art.

The inventor claims:

1. In a voltage regulation system including a series transistor and means responsive to load conditions for controlling the transistor: a preload circuit for absorbing the minimum transistor current under conditions of minimum load; and means for reducing the conductivity of the preload circuit in response to increase of the load.

2. In a voltage regulation system including a series transistor and means responsive to load conditions for controlling the transistor: a preload circuit for absorbing the minimum transistor current under conditions of minimum load; means for reducing the conductivity of the preload circuit in response to increase of the load; and adjustable means for determining the conductivity of the preload circuit for minimum load conditions.

3. In a voltage regulation system including a series transistor and means responsive to load conditions for controlling the transistor: a preload circuit for absorbing the minimum transistor current under conditions of minimum load; means for reducing the conductivity of the preload circuit in response to increase of the load; adjustable means for determining the conductivity of the preload circuit for minimum load conditions; and means for adjusting the change of the preload circuit conductivity per unit of load current whereby the combined current consumption of the device is controlled.

4. In a voltage regulation system including a series transistor and means responsive to load conditions for controlling the transistor: a preload circuit for absorbing the minimum transistor current under conditions of minimum load; means for reducing the conductivity of the preload circuit in response to increase of the load; adjustable means for determining the conductivity of the preload circuit for minimum load conditions; and means for adjusting the change of the preload circuit conductivity per unit of load current so that the combined current of the preload circuit and the main load circuit always exceeds that at minimum load conditions.

5. In a voltage regulation system including a series transistor and means responsive to load conditions for controlling the transistor: a preload circuit for absorbing the minimum transistor current under conditions of minimum load, including a control device of variable conductivity having an input circuit; a bridge circuit having an input and an output as well as a variable circuit element; means connecting the bridge output circuit to the input circuit of the control device; means for providing bridge excitation; and circuit means for varying the variable circuit element to change the bridge balance in response to load current.

6. In a voltage regulation system including a series transistor and means responsive to load conditions for controlling the transistor: a preload circuit for absorbing the minimum transistor current under conditions of minimum load, including a second transistor and a serially joined resistor; control means for the second transistor, and responsive to increase in load for varying the conductivity of the second transistor; and means responsive to change in operating voltage for varying the resistance of said serially joined resistor whereby the maximum power dissipation in said second transistor may be maintained substantially constant and at a low level.

7. In a voltage regulation system including a series transistor and means responsive to load conditions for controlling the transistor: a preload circuit for absorbing the minimum transistor current under conditions of minimum load, including a control device of variable conductivity having an input circuit; a small sensing resistor serially connected to the load; a bridge circuit having an input and an output; one branch of the bridge including a second control device of variable conductivity and having an input circuit; means connecting the bridge output circuit to the input circuit of the first control device; means providing bridge excitation; adjustable means for determining the normal operation of the input circuit to said second control device; and circuit means connecting said sensing resistor to said input circuit of said second control device modifying the bridge output in response to load current, thereby reducing the conductivity of said preload circuit.

8. The combination as set forth in claim 7 in which said sensing resistor is adjustable for varying the effect thereof on said input circuit of said second control device.

No references cited.